(12) United States Patent
Xia et al.

(10) Patent No.: US 11,029,260 B2
(45) Date of Patent: Jun. 8, 2021

(54) SOLDER PASTE PRINTING QUALITY INSPECTION SYSTEM AND METHOD

(71) Applicants: HONGFUJIN PRECISION ELECTRONICS (CHENGDU) Co., Ltd., Chengdu (CN); HON HAI PRECISION INDUSTRY CO., LTD., New Taipei (TW)

(72) Inventors: Zi-Qing Xia, Chengdu (CN); Xiao-Lei Liu, Chengdu (CN); Min Chen, Chengdu (CN); Yi-Kun Wang, Chengdu (CN); Fu-Ju Zeng, Chengdu (CN)

(73) Assignees: HONGFUJIN PRECISION ELECTRONICS (CHENGDU) Co., Ltd., Chengdu (CN); HON HAI PRECISION INDUSTRY CO., LTD., New Taipei (TW)

( * ) Notice: Subject to any disclaimer, the term of this patent is extended or adjusted under 35 U.S.C. 154(b) by 141 days.

(21) Appl. No.: 16/398,764

(22) Filed: Apr. 30, 2019

(65) Prior Publication Data
US 2020/0292471 A1    Sep. 17, 2020

(30) Foreign Application Priority Data
Mar. 15, 2019    (CN) .................... 201910199967.X

(51) Int. Cl.
  *G01N 21/88*    (2006.01)
  *G01N 21/956*   (2006.01)
  *G06T 7/00*     (2017.01)

(52) U.S. Cl.
  CPC .  *G01N 21/95684* (2013.01); *G01N 21/95607* (2013.01); *G06T 7/001* (2013.01);
  (Continued)

(58) Field of Classification Search
  None
  See application file for complete search history.

(56) References Cited

U.S. PATENT DOCUMENTS 5,455,870 A  *  10/1995  Sepai .............. G01N 21/95684
                                                        382/147
5,598,345 A  *   1/1997  Tokura .................. G01R 31/71
                                                        382/150
(Continued)

FOREIGN PATENT DOCUMENTS

CN         202126426 U       1/2012
TW         I395941           5/2013
(Continued)

OTHER PUBLICATIONS

E Jabbar, et al. "Supervised Learning Approach for Surface-Mount Device Production," In Machine Learning, Optimization, and Data Science. LOD 2018. Lecture Notes in Computer Science, vol. 11331. Springer, Cham. First Online: Feb. 14, 2019. https://doi.org/10.1007/978-3-030-13709-0_21 (Year: 2019).*

(Continued)

*Primary Examiner* — Soo Shin
(74) *Attorney, Agent, or Firm* — ScienBiziP, P.C.

(57) ABSTRACT

A solder paste printing quality inspection (SPI) method includes establishing at least one data inspection model, acquiring real-time test data, preprocessing the real-time test data, and determining a type of the real-time test data and inputting the real-time test data into the data inspection model corresponding to the type of the real-time test data to obtain a judgment result of the solder paste printing quality inspection. The real-time test data includes one or both of a test image and a test value of solder paste printing quality inspection. The preprocessing includes obtaining key (Continued)

parameters of the test value or obtaining image data of the test image and standardizing the real-time test data.

12 Claims, 4 Drawing Sheets

(52) U.S. Cl.
CPC .............. *G01N 2021/95615* (2013.01); *G01N 2021/95646* (2013.01); *G06T 2207/20081* (2013.01); *G06T 2207/20084* (2013.01); *G06T 2207/30152* (2013.01)

(56) References Cited

U.S. PATENT DOCUMENTS

| | | | |
|---|---|---|---|
| 5,751,910 A | 5/1998 | Bryant et al. | |
| 5,963,662 A * | 10/1999 | Vachtsevanos | G01N 21/88 250/332 |
| 6,891,967 B2 | 5/2005 | Prince | |
| 7,171,897 B2 * | 2/2007 | Barajas | H05K 3/1233 101/129 |
| 9,052,294 B2 * | 6/2015 | Walton | G01N 21/8806 |
| 2004/0184648 A1 * | 9/2004 | Zhang | G06T 7/586 382/141 |
| 2006/0018531 A1 * | 1/2006 | Murakami | G01N 21/8851 382/145 |
| 2010/0100337 A1 * | 4/2010 | Vichare | G06F 11/008 702/34 |
| 2011/0216186 A1 * | 9/2011 | Shinyama | H04N 7/18 348/126 |
| 2018/0341248 A1 * | 11/2018 | Mehr | G06N 3/0454 |
| 2019/0200494 A1 * | 6/2019 | Kim | G06T 7/001 |
| 2019/0362482 A1 * | 11/2019 | Han | H05K 13/08 |

FOREIGN PATENT DOCUMENTS

| | | | | |
|---|---|---|---|---|
| TW | I399515 B1 | 6/2013 | | |
| WO | WO-2020048119 A1 * | 3/2020 | ....... | G01N 21/95684 |

OTHER PUBLICATIONS

H Wu, "Solder joint defect classification based on ensemble learning," Soldering & Surface Mount Technology, 29/3 (2017) 164-170 (Year: 2017).*

Cai et al., "SMT Solder Joint Inspection via Novel Cascaded Convolutional Neural Network," IEEE Transactions on Components, Packaging, and Manufacturing Technology, vol. 8, No. 4, Apr. 2018 (Year: 2018).*

* cited by examiner

SOLDER PASTE PRINTING QUALITY INSPECTION SYSTEM AND METHOD

FIELD

The subject matter herein generally relates to solder paste printing quality inspection, and more particularly to an improved method of inspecting solder paste printing on circuit boards.

BACKGROUND

Solder paste printing quality of a printed circuit board (PCB) is generally detected by a Solder Paste Inspection (SPI) machine. However, the SPI detection result has a high false detection rate and a high detection failure rate, so manual inspection is required. During manual assessment, the PCB is compared with the SPI test data and pictures, which is time-consuming and may be judged inaccurately by personnel.

BRIEF DESCRIPTION OF THE DRAWINGS

Implementations of the present disclosure will now be described, by way of embodiments, with reference to the attached figures.

DETAILED DESCRIPTION

Figure 1:
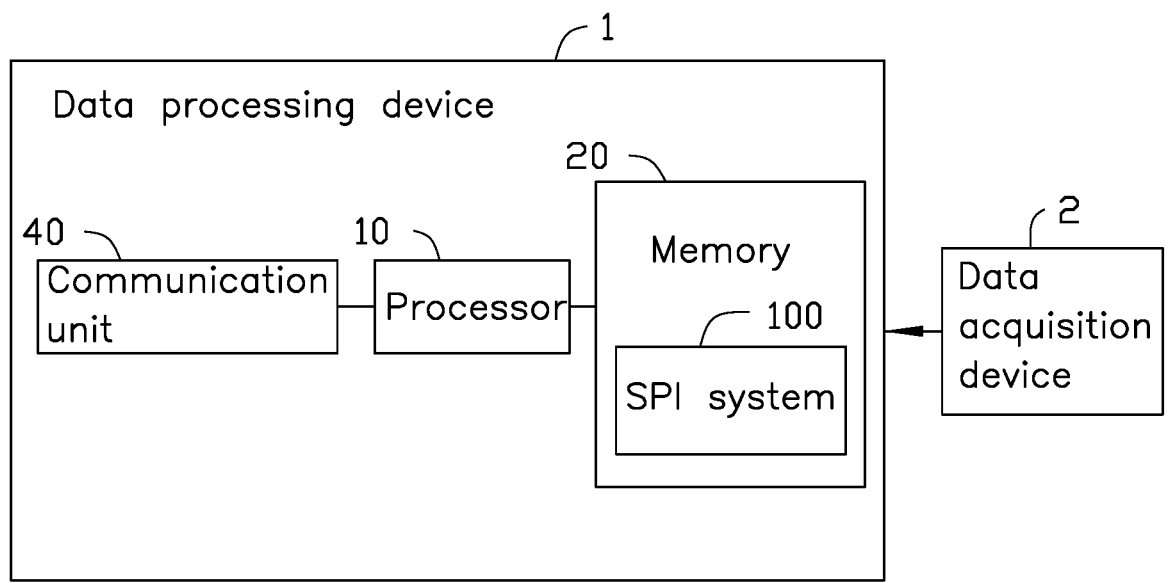
FIG. 1 is a block diagram of an embodiment of a data processing device for implementing a solder paste printing quality inspection (SPI) system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows a schematic diagram of an embodiment of a data processing device 1. The data processing device 1 includes a processor 10, a memory 20, and a communication unit 40. The memory 20 and the communication unit 40 are electrically coupled to the processor 10. The data processing device 1 is communicatively coupled to at least one data acquisition device 2. The data acquisition device 2 is used to collect test values and test images during quality inspection of solder paste printing. In one embodiment, the data acquisition device 2 is a solder paste inspection (SPI) machine.

The processor 10 may be a central processing unit (CPU), a digital signal processor, a single chip microcomputer, or the like, and is adapted to execute a plurality of instructions.

The memory 20 can be used to store computer programs and/or modules/units that operate or execute computer programs and/or modules/units stored within the memory 20. The data implements various functions of the data processing device 1. The memory 20 may be, but not limited to, a Read-Only Memory (ROM), a Random Access Memory (RAM), a Programmable Read-Only Memory (PROM), an Erasable Programmable Read-Only Memory (EPROM), a One-Time Programmable Read-Only Memory (OTPROM), an Electronically-Erasable Programmable Read-Only Memory (EEPROM), a Compact Disc Read-Only Memory (CD-ROM), or other optical disc storage, disk storage, tape storage, or any other computer readable medium by which data can be stored.

The communication unit 40 is configured to establish communication connection with the data acquisition device 2. The communication unit 40 can be a wired communication unit or a wireless communication unit.

It will be understood by those skilled in the art that FIG. 1 is only an example of the data processing device 1 and does not constitute a limitation on the data processing device 1, and may include more or less components than those illustrated, combine some components, or have different components. For example, the data processing device 1 may also include input and output devices, network access devices, buses, and the like.

Figure 2:
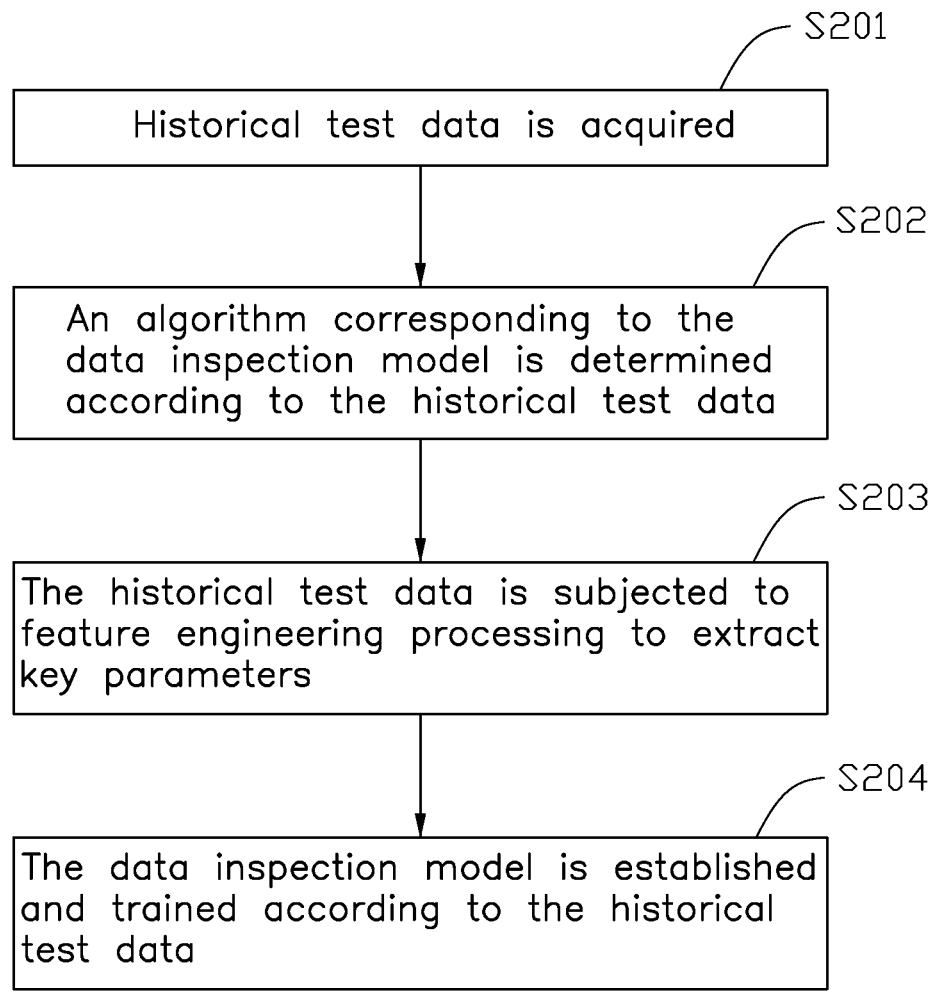
FIG. 2 is a flowchart of an embodiment of a method for establishing a data inspection model.

FIG. 2 shows a flowchart of an embodiment of a method for establishing a data inspection model. The order of blocks in the flowchart may be changed according to different requirements, and some blocks may be omitted.

At block S201, historical test data is acquired.

In one embodiment, the historical test data includes test values, test pictures, and verification results output by the SPI machine.

At block S202, an algorithm corresponding to the data inspection model is determined according to the historical test data.

In the related art, an inspection result of SPI is generally "pass" or "fail", which is a normal classification problem. Since a generalization ability of a random forest algorithm has a small generalization error and high accuracy of inspection judgment, in the present disclosure, a core algorithm for establishing the data inspection model includes the random forest algorithm.

For quality problems of solder paste printing such as continuous solder paste printing, misalignment, and multiple printing defects that are inspected by test images, a convolutional neural network algorithm is used. A data model based on the convolutional neural network algorithm can extract image features in a convolution layer according to the test data and reduce image resolution in a pooling layer, thereby simplifying operation to output an image classification probability in a normalized index layer and obtain a judgment result. Therefore, in the present disclosure, the core algorithm of the data inspection model further includes the convolutional neural network algorithm.

At block S203, the historical test data is subjected to feature engineering processing to extract key parameters.

Data input by the feature engineering processing includes not only a principle judgment result, the test images, and the test values output by the SPI machine, but also includes domain knowledge, such as personal judgment experience of an experienced personnel.

The test data is processed by feature engineering to generate a sample data set for model training. The machine learning uses a large amount of data training, and the algorithm determined by the algorithm determined at block S202 analyzes the test data to self-learn and make decisions and predictions. Then, the final key parameters are selected.

At block S204, the data inspection model is established and trained according to the key parameters.

The data inspection model is established according to the algorithm determined at block S202 and the key parameters input at block S203, and SPI and judgment training is performed on the data inspection model. In order to improve the accuracy of the judgment result, the key parameters are input to train the data inspection model. Finally, the data inspection model is determined according to the judgment result.

In one embodiment, the data inspection model includes a data inspection model established based on a random forest algorithm and a data inspection model established based on a convolutional neural network algorithm.

In one embodiment, the test data includes the test values, the test images. When the test data is a test value, the data inspection model based on a random forest algorithm is used. When the test data is a test image, the data inspection model based on a convolutional neural network algorithm is used.

It can be understood that in other embodiments, before block S202, the test data is preprocessed and standardized to obtain a standardized feature vector.

It can be understood that in other embodiments, due to a plurality of data types, the determined core algorithm may include multiple established data models, so that the corresponding data model for judgment of different data types is selected.

Figure 3:
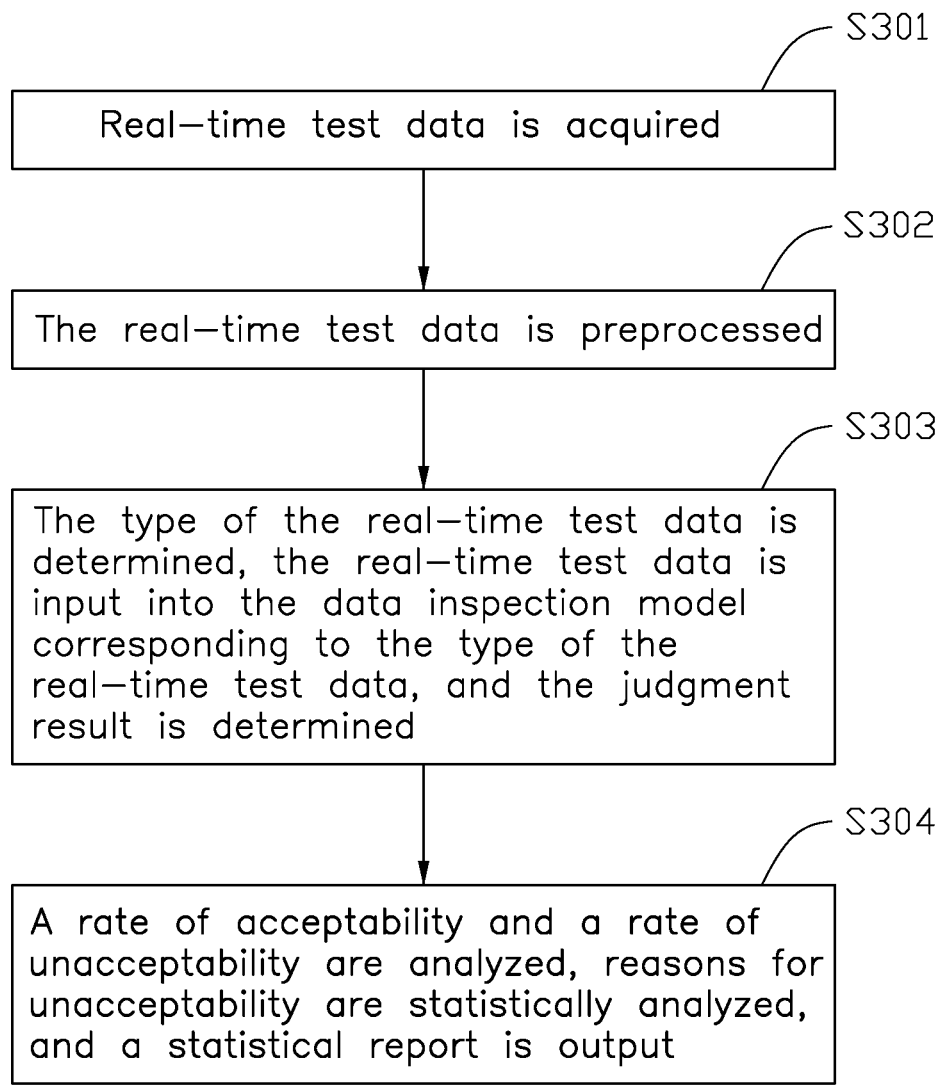
FIG. 3 is a flowchart of an embodiment of an SPI method.

FIG. 3 shows a flowchart of an embodiment of an SPI method. The order of the blocks in the flowchart may be changed according to different requirements, and some blocks may be omitted.

At block S301, real-time test data is acquired.

The data processing device 1 acquires real-time test data through at least one data acquisition device 2 and stores the real-time test data in the memory 20.

In one embodiment, the real-time test data includes one or both of a test image and a test value output by an SPI machine.

At block S302, the real-time test data is preprocessed.

In one embodiment, the preprocessing includes standardizing the real-time test data, obtaining a standardized feature vector, obtaining key parameters of the test value, and obtaining image data of the test image.

At block S303, the type of the real-time test data is determined, the real-time test data is input into the data inspection model corresponding to the type of the real-time test data, and the judgment result is determined.

In one embodiment, the real-time test data is classified to determine the type of the real-time test data. The type of the real-time test data is a test value or a test image. The data inspection model corresponding to the type of the real-time test data is implemented according to the type of the real-time test data. That is, when the real-time test data is a test value, the corresponding data inspection model is the random forest algorithm. When the real-time test data is a test image, the corresponding data inspection model is the convolutional neural network algorithm.

When the real-time test data includes both the test value and the test image, the data inspection model based on the random forest algorithm and the data inspection model based on the convolutional neural network algorithm are both implemented. According to a performance of the two data inspection models, the data inspection model with the better performance is selected, and the judgment result determined by the data inspection model with the better performance is used as the final judgment result of the test data. The final judgment result is whether the solder paste printing quality is acceptable or unacceptable.

At block S304, a rate of acceptability and a rate of unacceptability are analyzed, reasons for unacceptability are statistically analyzed, and a statistical report is output.

According to the judgment result, data of unacceptable solder paste printing quality is collected, the rate of acceptability and the rate of unacceptability are analyzed, and the statistical report is output to provide data support for subsequent quality improvement.

It can be understood that in other embodiments, after block S304, if the rate of unacceptability increases abnormally, an alarm process is initiated to alert a worker that the solder paste printing machine may be malfunctioning. The alarm process may include an audible alarm, a visual alarm, and/or a message notification alarm.

Figure 4:
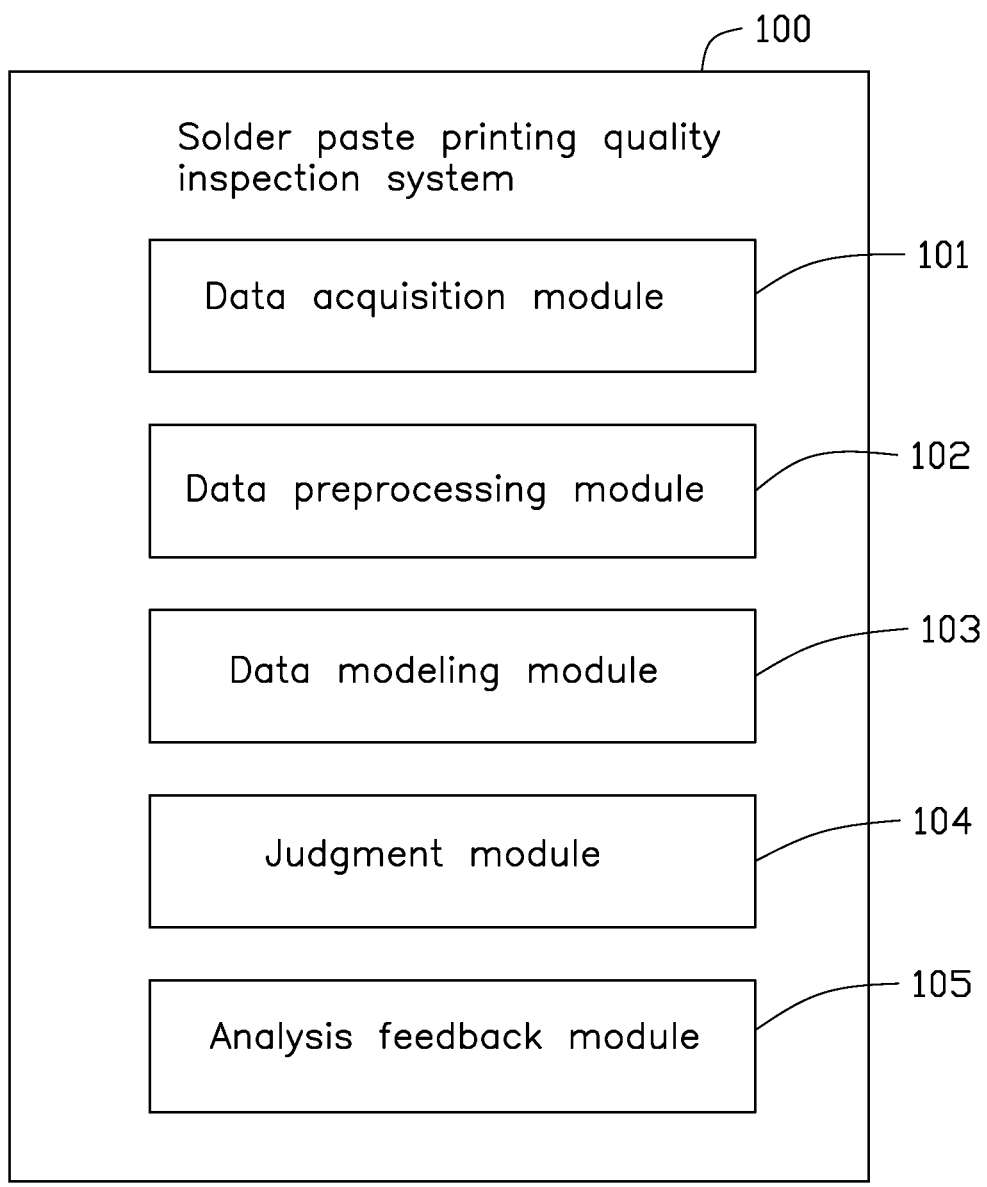
FIG. 4 is a block diagram of functional modules of the SPI system.

FIG. 4 shows an embodiment of a solder paste printing quality inspection system 100 (hereinafter "the SPI system 100) implemented in the data processing device 1. The SPI system 100 can be divided into a plurality of functional modules, which may include a data acquisition module 101, a data preprocessing module 102, a data modeling module 103, a judgment module 104, and an analysis feedback module 105.

The data acquisition module 101 is configured to acquire test data, including historical test data and real-time test data, through at least one data acquisition device 2, and store the test data in the memory 20. The test data includes one or more of test values and test pictures.

The data preprocessing module 102 is configured to convert the test data into standardized parameters, which can be used as input values for determining the data inspection model. In one embodiment, the data preprocessing module is configured to extract key parameters of test values or image data of test images, and normalize the real-time test data.

The data modeling module 103 is configured to establish the data inspection model for judging a test result by using a data modeling method. In one embodiment, the data inspection model includes a data inspection model established based on a random forest algorithm and a data inspection model established based on a convolutional neural network algorithm.

The judgment module 104 is configured to implement the data inspection model and perform inspection on the real-time test data to obtain a judgment result.

The judgment module 104 is further configured to classify the real-time test data and implement the data inspection model corresponding to the type of the real-time test data.

The analysis feedback module 105 is configured to analyze the judgment result to obtain and output an analysis feedback report.

When the processor 10 executes the SPI system 100, the blocks in one embodiment of the SPI method are implemented, such as the blocks shown in FIG. 3.

The core algorithm based on the random forest algorithm and/or the convolutional neural network algorithm for different types of test objects can overcome the problems in the related art regarding a high rate of faulty judgment and time-consuming manual inspection. The data model based on the random forest algorithm may be used to inspect test values, and the data model based on the convolutional neural network algorithm may be used to inspect test images, thereby improving accuracy of inspection.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A solder paste printing quality inspection (SPI) method comprising:
    establishing at least one data inspection model comprising a data inspection model based on the random forest algorithm and a data inspection model based on the convolutional neural network algorithm;
    acquiring real-time test data comprising one or both of a test image and a test value of solder paste printing quality inspections;
    preprocessing the real-time test data, the preprocessing comprising obtaining parameters of the test value or obtaining image data of the test image, and standardizing the real-time test data; and
    determining a type of the real-time test data, and inputting the real-time test data into the data inspection model corresponding to the type of the real-time test data to obtain a judgment result of the solder paste printing quality inspection, wherein
    when the type of the real-time test data is the test value, the data inspection model based on the random forest algorithm is implemented;
        when the type of the real-time test data is the test image, the data inspection model based on the convolutional neural network algorithm is implemented;
        when the type of the real-time test data is the test value and the test image, the data inspection model based on the random forest algorithm and the data inspection model based on the convolutional neural network algorithm are both implemented;
        the judgment result of the test value is output by the data inspection model based on the random forest algorithm; and
        the judgment result of the test image is output by the data inspection model based on the convolutional neural network algorithm.

2. The SPI method of claim 1, wherein establishing the data inspection model comprises:
    acquiring historical test data;
    determining an algorithm corresponding to the data inspection model according to the historical test data;
    subjecting the historical test data to feature engineering processing to extract the parameters; and
    establishing and training the data inspection model according to the parameters.

3. The SPI method of claim 2, wherein:
    the historical test data comprises the test value, the test image, test principles, and domain knowledge.

4. The SPI method of claim 2, wherein:
    the algorithm comprises a random forest algorithm and a convolutional neural network algorithm.

5. The SPI method of claim 1 further comprising:
    analyzing a rate of acceptability and a rate of unacceptability, statistically analyzing reasons for unacceptability, and outputting a statistical report.

6. The SPI method of claim 5 further comprising:
    initiating an alarm process if the rate of unacceptability increases abnormally to alert a worker that a solder paste printing machine may be malfunctioning.

7. A data processing device comprising:
    a processor; and
    a memory storing a plurality of instructions, which when executed by the processor, cause the processor to:
    establish at least one data inspection model comprising a data inspection model based on the random forest algorithm and a data inspection model based on the convolutional neural network algorithm;
    acquire real-time test data comprising one or both of a test image and a test value of solder paste printing quality inspections;
    preprocess the real-time test data, the preprocessing comprising obtaining parameters of the test value or obtaining image data of the test image, and standardizing the real-time test data; and
    determine a type of the real-time test data, and input the real-time test data into the data inspection model corresponding to the type of the real-time test data to obtain a judgment result of the solder paste printing quality inspection, wherein
    when the type of the real-time test data is the test value, the data inspection model based on the random forest algorithm is implemented;
    when the type of the real-time test data is the test image, the data inspection model based on the convolutional neural network algorithm is implemented;
    when the type of the real-time test data is the test value and the test image, the data inspection model based on the random forest algorithm and the data inspection model based on the convolutional neural network algorithm are both implemented;
    the judgment result of the test value is output by the data inspection model based on the random forest algorithm; and
    the judgment result of the test image is output by the data inspection model based on the convolutional neural network algorithm.

8. The data processing device of claim 7, wherein the data inspection model is established by:
    acquiring historical test data;

determining an algorithm corresponding to the data inspection model according to the historical test data;
subjecting the historical test data to feature engineering processing to extract the parameters; and
establishing and training the data inspection model according to the parameters.

9. The data processing device of claim 8, wherein:
the historical test data comprises the test value, the test image, test principles, and domain knowledge.

10. The data processing device of claim 8, wherein:
the algorithm comprises a random forest algorithm and a convolutional neural network algorithm.

11. The data processing device of claim 7, wherein the processor is further configured to:
analyze a rate of acceptability and a rate of unacceptability, statistically analyze reasons for unacceptability, and output a statistical report.

12. The data processing device of claim 11, wherein the processor is further configured to:
initiate an alarm process if the rate of unacceptability increases abnormally to alert a worker that a solder paste printing machine may be malfunctioning.

* * * * *